US012106266B2

(12) United States Patent
Schepens (10) Patent No.: US 12,106,266 B2
(45) Date of Patent: Oct. 1, 2024

(54) DEVICE FOR INDICATING STATUS OF A CONTAINER AND RELATED METHODS

(71) Applicant: BELINTRA NV, Semmerzake (BE)

(72) Inventor: Geert Schepens, Semmerzake (BE)

(73) Assignee: BELINTRA NV, Semmerzake (BE)

(*) Notice: Subject to any disclaimer, the term of this patent is extended or adjusted under 35 U.S.C. 154(b) by 532 days.

(21) Appl. No.: 17/609,811

(22) PCT Filed: May 13, 2020

(86) PCT No.: PCT/EP2020/063323
§ 371 (c)(1),
(2) Date: Nov. 9, 2021

(87) PCT Pub. No.: WO2020/234084
PCT Pub. Date: Nov. 26, 2020

(65) Prior Publication Data
US 2022/0215335 A1 Jul. 7, 2022

(30) Foreign Application Priority Data
May 17, 2019 (BE) .................... 2019/5326

(51) Int. Cl.
*G06Q 10/087* (2023.01)
*G06K 19/06* (2006.01)
(52) U.S. Cl.
CPC ..... *G06Q 10/087* (2013.01); *G06K 19/06028* (2013.01)
(58) Field of Classification Search
CPC ............. G06Q 10/087; G06K 19/06028
See application file for complete search history.

(56) References Cited

U.S. PATENT DOCUMENTS 9,476,739 B2* 10/2016 Clarke .................. G09F 3/0297
2013/0341413 A1 12/2013 Clarke
2014/0292493 A1 10/2014 Clarke et al.

FOREIGN PATENT DOCUMENTS

| AU | 9697898 A | 7/1999 |
| GB | 2435731 A | 9/2007 |
| GB | 2496469 A | 5/2013 |

OTHER PUBLICATIONS

PCT International Search Report dated Aug. 31, 2020 in connection with PCT International Patent Application No. PCT/EP2020/063323.

(Continued)

*Primary Examiner* — Paul Danneman
(74) *Attorney, Agent, or Firm* — Amster, Rothstein & Ebenstein LLP (57) ABSTRACT

A status-indicating device (10) for indicating a status of a container comprising a support panel and a flap (200) manually actuateable between a first (210) and second (220) position, a permanent magnet (130) disposed in relation to the support panel (100), a slidable member (300) slidably attached to the flap (200), manually slidable between a retracted (316) and an deployed (318) position, wherein the flap (200) is configured such that an exposed portion (312) of the slidable member (300) is unmasked in the deployed (318) position; and the flap (200) comprises a magnetically-regulated linear ratchet mechanism (250) activated in the flap (200) first (210) position and deactivated in the flap (200) second (220), configured when activated to restrict movement of the slidable member (300) towards the retracted position (316).

27 Claims, 8 Drawing Sheets

(56) References Cited

OTHER PUBLICATIONS

PCT Written Opinion dated Aug. 31, 2020 in connection with PCT International Patent Application No. PCT/EP2020/063323.

* cited by examiner

DEVICE FOR INDICATING STATUS OF A CONTAINER AND RELATED METHODS

CROSS-REFERENCE TO RELATED APPLICATIONS

This application is a U.S. national stage entry under 35 U.S.C. § 371 of PCT International Patent Application No. PCT/EP2020/063323, filed May 13, 2020, which claims priority to Belgian Patent Application No. BE2019/5326, filed May 17, 2019, the contents of each of which are incorporated herein by reference in their entirety.

FIELD OF THE INVENTION

Provided is a manually actuateable device having first, second and third indicating state, wherein the third indicating state is activateable in one of the first and second states. The device is useful in signalling a status of a container.

BACKGROUND TO THE INVENTION

Conventionally, items that are consumed in an irregular manner, for example, items in a hospital store or pharmacy, are each stored in a separate container from which consumers freely take as needed, whereby each container has to be refilled on a continuous basis. This is mandatory for the case that items are needed and/or unexpectedly a high number of these items are needed instantaneously. Consequently, there has to be a permanent control of the each container in order to avoid a sudden depletion of items, which may lead to unpleasant or even fatal consequences. In cases where supply time is lengthy and demand is difficult to forecast, often, there is a need to permanently keep an overview of items in multiple containers, which is cumbersome.

The Kanban card system signals a need to replenish a container. A physical card containing information about the item is placed within the container; when the container is depleted or near-depleted the card becomes accessible or visible. A "Kanban trigger" is created which may be manual or automatic, a purchase order is released, sometimes with a quantity for the supplier defined on the card, and the supplier is instructed to dispatch the items.

There are numerous problem of the Kanban card system. Cards may be mis-assigned; a card that has been placed in the wrong container will trigger re-ordering of the wrong item which can have severe implications in a care environment. There is a lack of knowledge of an order status of an item; where a container is empty, a consumer can expend valuable time resource enquiring on status with order management. In an environment such as an industrial warehouse supply or hospital, hundreds of container may be present, and re-ordering may automated, (e.g. by barcodes). In such environment it is not apparent to the consumer whether the empty container has been notified, and it is burdensome and time-consuming to follow up.

It is an object of the invention to provide an efficient way of managing items, in particular products such as medical consumable items (e.g. needles, syringes, gauze, pharmaceuticals) an industrial or care environment such as a hospital or clinic. It is an object to provide a device that allows a sequential signalling of status of a container.

In order to achieve the object defined above, a device, a method and a computer-readable medium according to the independent claims are provided.

SUMMARY OF THE INVENTION

Provided herein is a status-indicating device (10) for indicating a status of a container comprising:

a support panel (100) having a forward-facing side (110) and an opposing back-facing side (120);

a flap (200) attached by a hinge in relation the forward-facing side (110) of the support panel (100) manually actuateable between a first (210) and second (220) position, a permanent magnet (130) disposed in relation to the support panel (100) wherein the flap (200) is configured to engage the permanent magnet (130) in the second position (220), a slidable member (300) slidably attached to the flap (200), manually slidable between a retracted (316) and an deployed (318) position, wherein:
the flap (200) is configured such that an exposed portion (312) of the slidable member (300) is unmasked in the deployed (318) position; and
the flap (200) comprises a magnetically-regulated linear ratchet mechanism (250) activated in the flap (200) first (210) position and deactivated in the flap (200) second (220), configured when activated to restrict movement of the slidable member (300) towards the retracted position (316).

The permanent magnet (130) may be configured to deactivate the linear ratchet mechanism (250) when the flap (200) in the second (220) position.

The flap (200) may comprise:
a first (212) side comprising a first visual indicating surface (214) visible in the first position (210) and concealed in the second position (220), and
an opposing second (222) side comprising a second visual indicating surface (224) visible in the second position (220) and concealed in the first position (210).

The positions of the flap (200) and slidable member (300) may be machine-readable; and/or first visual indicating surface (214) and second visual indicating surface (224) may be machine-readable.

The second visual indicating surface (224) comprises a machine-readable barcode.

The device (10) may be further provided with a bracket (400) configured for dismountable attachment of the device (10) to a container, and configured to place the device (10) in an upright orientation wherein the second (220) position is above the first (210) position.

The magnetically-regulated linear ratchet mechanism (250) may comprise a ratchet and pawl, wherein:
the ratchet comprises a leaf spring (252) disposed in fixed relation to the slidable member (300),
the pawl (256) is disposed in fixed relation to the flap (200),
the leaf spring (252) in the flap (200) first position (210) is open and ratchet is enabled and linear ratchet mechanism (250) activated, and
the leaf spring (252) in the flap (200) second position (220) is closed by magnetic force of the permanent magnet (130), the ratchet is disabled, and linear ratchet mechanism (250) de-activated.

Further provided is a use of a device described herein for indicating a status of a container for holding a stock of items, wherein:
the flap (200) in the first position corresponds to a first state of the device (10) indicating that the container does not need to be replenished with items, and
the flap (200) in the second position corresponds to a second state of the device (10) indicating that the container needs to be replenished with items, the slidable member (300) in the deployed (318) position corresponds to a third state of the device (10) indicates that the container needs to be replenished, and that the items have been re-ordered.

Further provided is a method for determining individual statuses of containers in a set of containers, each container holding a stock of items comprising:

attaching a device (10) as described herein to each container in the set;

setting the flap (200) to the first position (210) and the slidable member (300) to the retracted position (316) when a container in the set does not need to be replenished with items, setting the flap (200) to the second position (220) when the items are exhausted from the container, when a container in the set needs to be replenished with items, thereby exposing the second visual indicating surface (224), setting the slidable member (300) to the deployed position (318) when items have been re-ordered thereby exposing the third visual indicating surface (314), setting the slidable member (300) to the retracted position (316) and the flap (200) to the first position (210) when the container has been replenished with items.

The devices (10) may be attached to the containers in the set of containers are read by a camera having a steerable field of view, FOV, direction wherein the camera is positioned and the containers are arranged such that the camera in a single FOV direction captures an image of some of the devices (10) of the set of containers, and the camera in multiple FOV directions captures multiple images covering all of the devices (10) of the set of containers, and the status of each and every container in the set of containers is determined from the multiple images.

The second visual indicating surface (224) and optionally first visual indicating surface (214) of the devices (10) may be read by the camera.

A change in state of a device (10) from $1^{st}$ state to $2^{nd}$ state may release a purchase order of items associated with the device (10) and container.

FIGURE LEGENDS

FIGS. 10A, B shows FOV directions moving in a weaving sequence indicated across a set of containers held on two rows of racks.

DETAILED DESCRIPTION OF INVENTION

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

Figure 1:
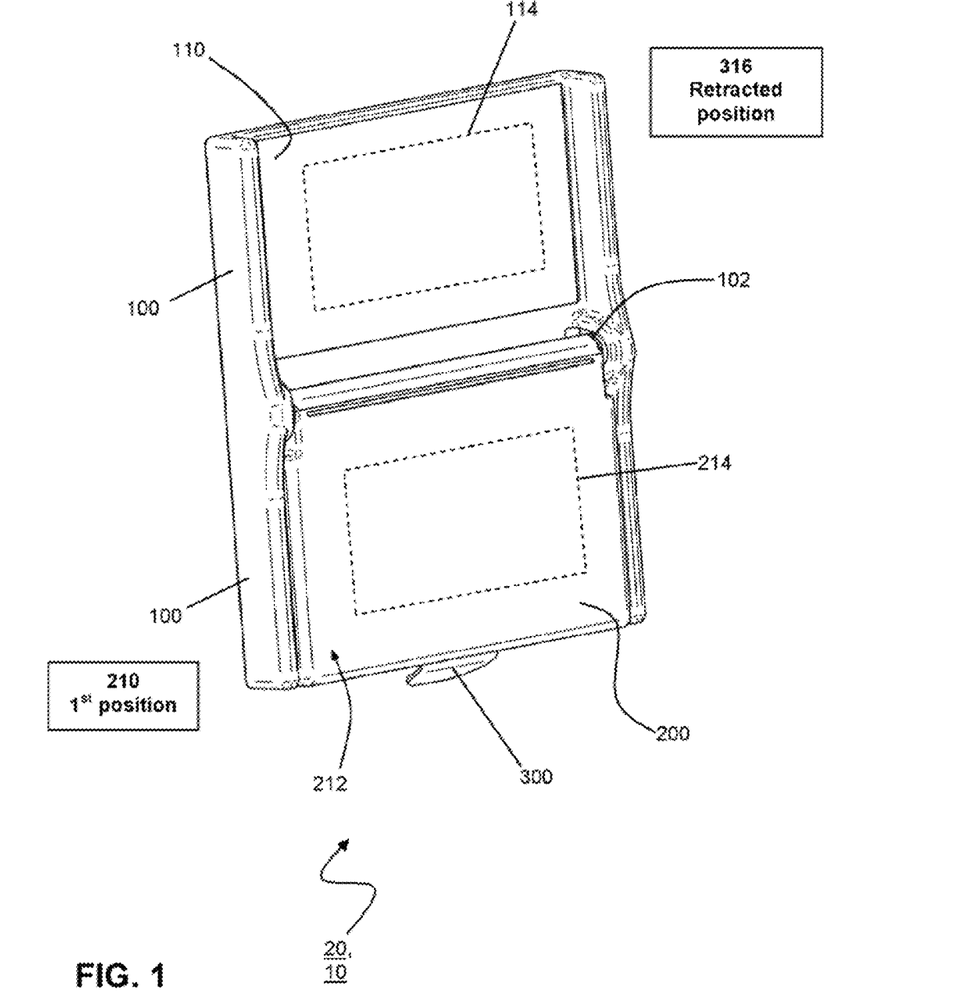
FIG. 1 is an isometric view of a presently-described device wherein the flap is in a first position and the slidable member is retracted.
Figure 2:
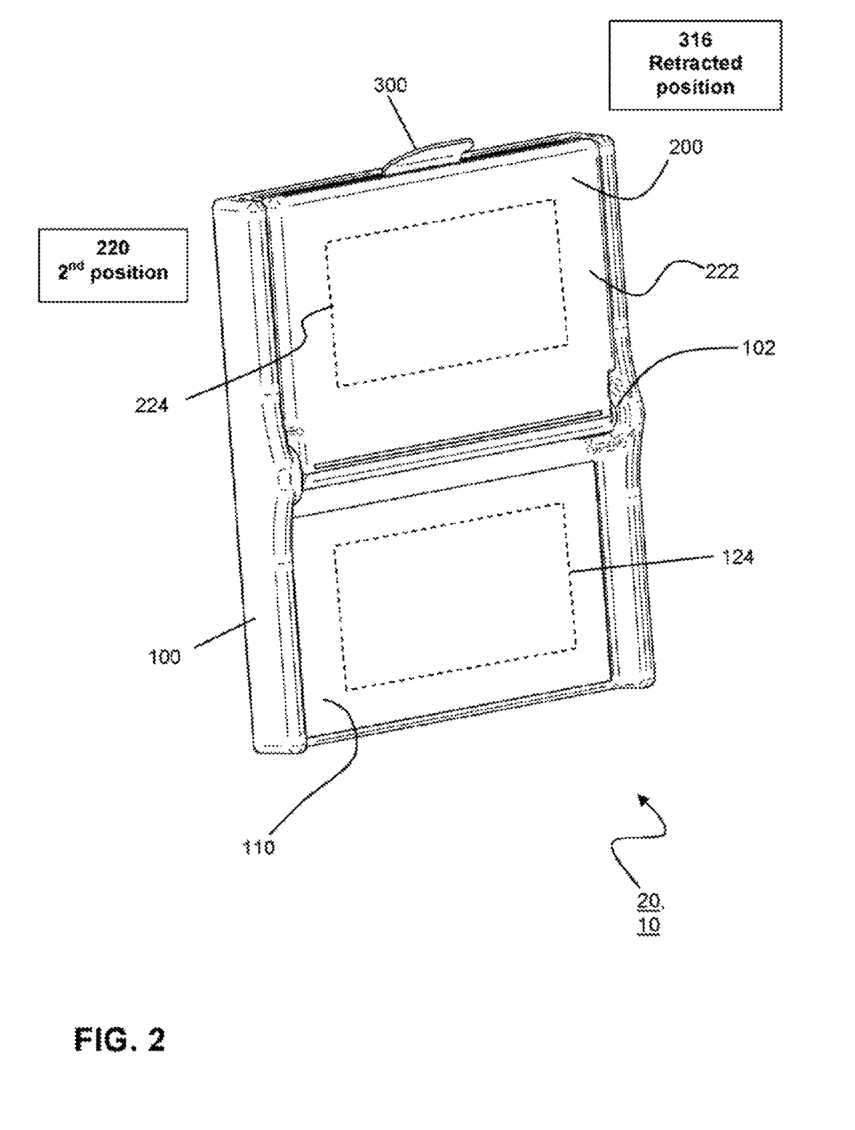
FIG. 2 is an isometric view of a presently-described device wherein the flap is in a second position and the slidable member is retracted.
Figure 3:
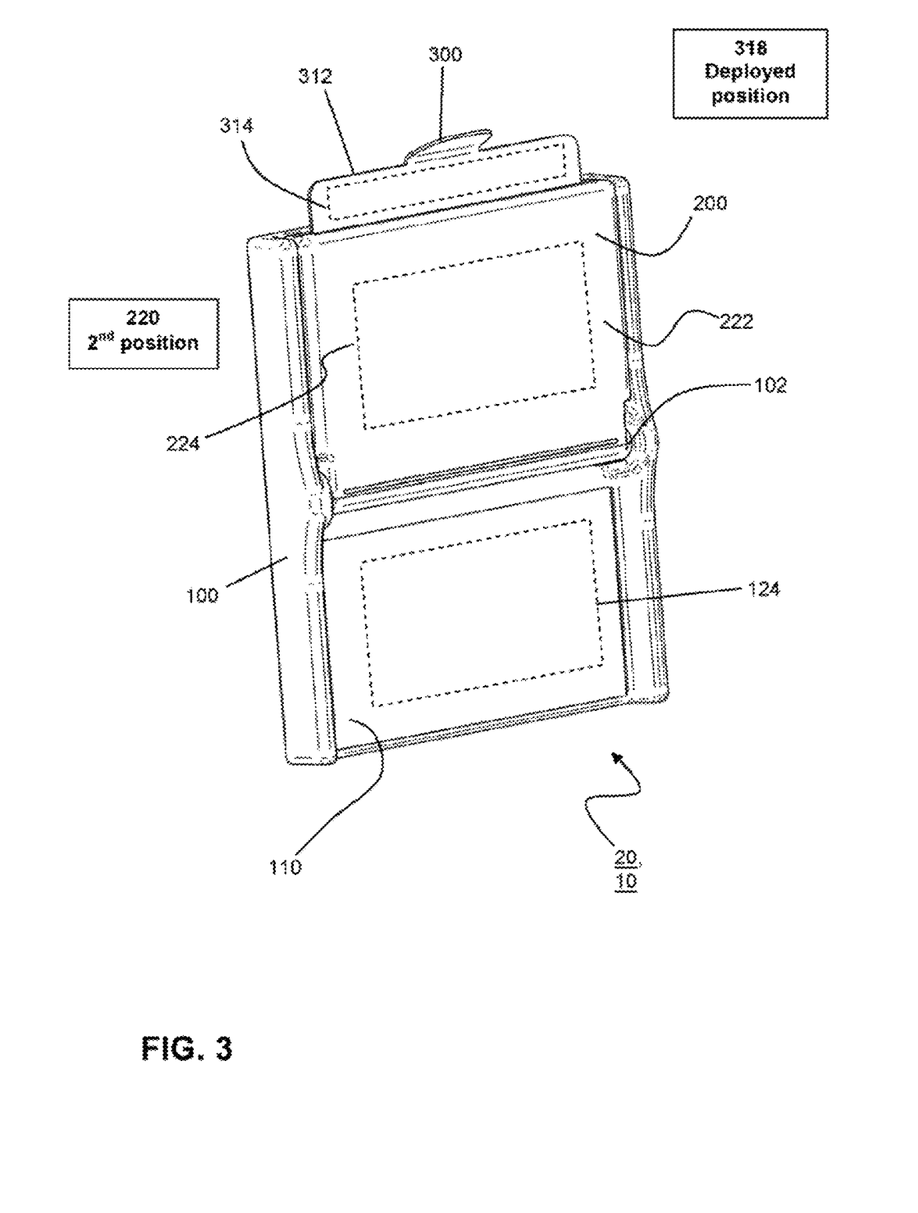
FIG. 3 is an isometric view of a presently-described device wherein the flap is in a second position and the slidable member is deployed.

Provided herein is a status-indicating device (10) for indicating a status of a container. The device has three stable states each of which is visually- and optionally machine-readable, indicating different statuses of the container. Exemplary devices are shown in FIGS. 1, 2 and 3. The status of the container may be indicative of a need or not to replenish items held within the container.

The device (10) is manually actuatable, meaning the consumer can manually adjust the status responsive to the perceived quantity of items in the container. Visually-readable means that the status can be perceived by the human eye (e.g. of the consumer). Machine-readable means that the status can be read by a machine comprising a sensor such as an optical sensor (e.g. CCD) and/or radiofrequency sensor (e.g. RFID).

A $1^{st}$ state (e.g. FIG. 1) of the device (10) indicates that the quantity of items in the container is sufficient, or above a threshold level, or that the container does not need to be replenished. A $2^{nd}$ state (e.g. FIG. 2) of the device (10) indicates that the quantity of items in the container is not sufficient, or below a threshold level, or that the container needs to be replenished. A $2^{nd}$ state (e.g. FIG. 2) indicates items need to be re-ordered. A $3^{rd}$ state (e.g. FIG. 3) of the device (10) indicates that the quantity of items in the container is not sufficient, or below a threshold level, or that the container needs to be replenished, and that the items have been re-ordered.

Each state is stable, and the $3^{rd}$ state can only be activated after the $2^{nd}$ state has been selected to avoid misinforming the consumer. The $2^{nd}$ state may be manually set by the consumer when it is visually evident that the quantity of items in the container is not sufficient, or is below a threshold level, or that the container needs to be replenished. Different items may have different consumption rates, and the consumer will know the optimum time to activate the $2^{nd}$ state, for example, when there is 0, 1, or 3 items remaining.

Figure 4:
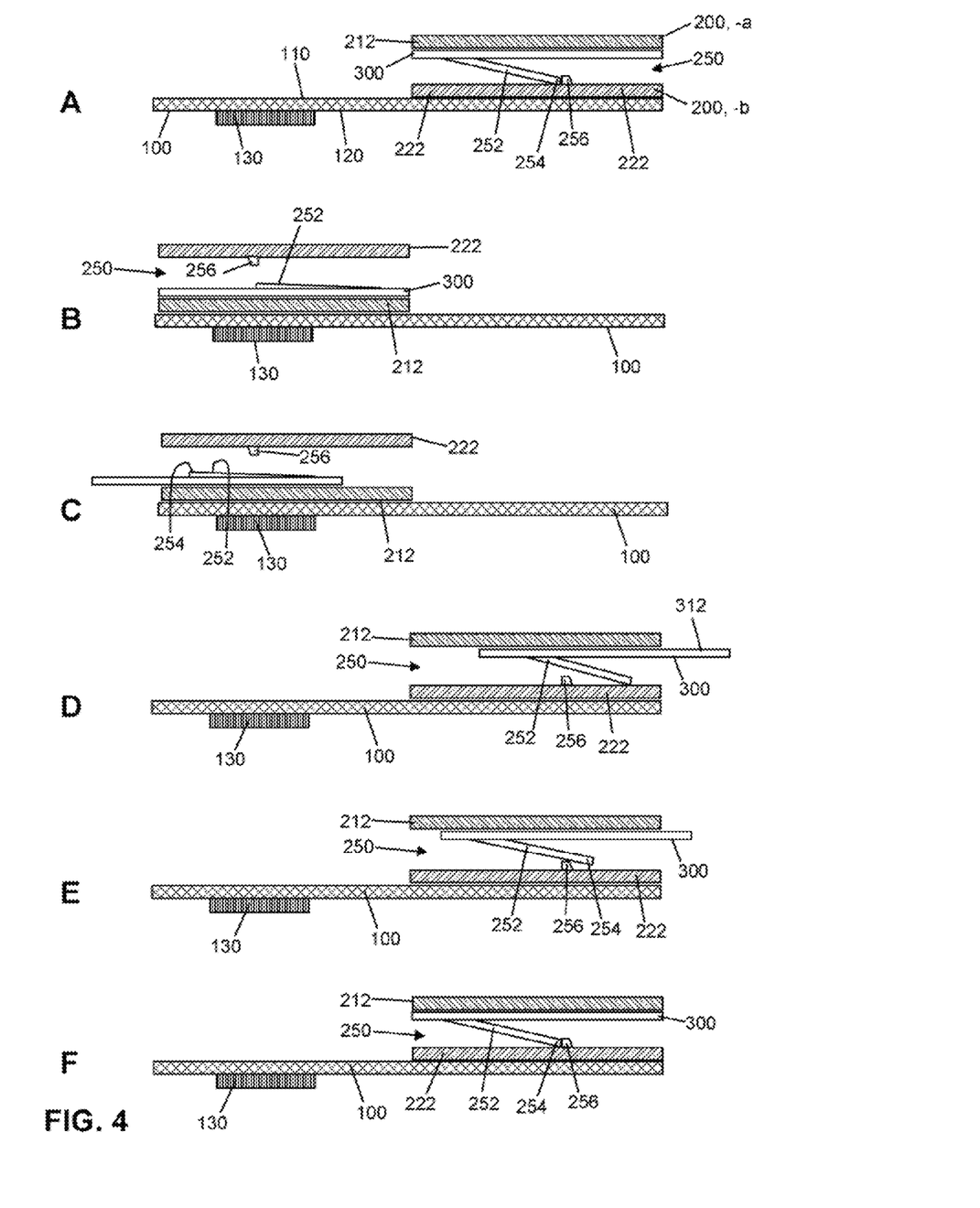
FIGS. 4A to 4F are cross sectional view of a presently-described device, showing a ratchet mechanism at stages of activation and de-activation.

The device (10) comprises a support panel (100) having a forward-facing side (110) (e.g. FIGS. 1-3) and an opposing back-facing side (120) as shown, for instance, in FIG. 4A. A flap (200) is attached by a hinge (102) in relation the forward-facing side (110) of the support panel (100). The hinge may be disposed such that an axis of rotation of the hinge is horizontal. The flap (200) is manually actuateable between a first (210) and second (220) position. The first position (210) may correspond to a downward orientated flap (200) (e.g. FIG. 1). The second position (220) may correspond to an upward orientated flap (200) (e.g. FIG. 2). The device (10) may have an upright orientation wherein the second (220) position is above the first (210) position.

The flap (200) in the first position (210) corresponds to the $1^{st}$ state (e.g. FIG. 1). The flap (200) has a first side (212) optionally disposed with a first visual indicating surface (214). The first side (212) and hence first visual indicating surface (214) are visible when the flap is in the first position (210). Position of the flap in first position (210) can be read by the consumer and/or machine. Optionally or additionally, the first visual indicating surface (214) in first position (210) can be read by the consumer and/or machine. The first side (212) and hence first visual indicating surface (214) are concealed when the flap is in the second position (220), and cannot be read by the consumer or machine.

The flap (200) in the second position (220) corresponds to the $2^{nd}$ state (e.g. FIG. 2). The flap (200) has a second side (222) opposing the first side (212), optionally disposed with a second visual indicating surface (224). The second side (222) and hence second visual indicating surface (224) are visible when the flap is in the second position (220). Position of the flap in second position (220) can be read by the consumer or machine. Optionally or additionally, the second visual indicating surface (224) in second position (220) can be read by the consumer and/or machine. The second side (222) and hence first visual indicating surface (224) are concealed when the flap is in the first position (210), and cannot be read by the consumer or machine.

A permanent magnet (130) disposed in relation to the support panel (100) configured to retain/engage the flap (200) in the second position (220) or $2^{nd}$ state (e.g. FIG. 4A to 4F, FIG. 5). The permanent magnet (130) may be provided attached to the support panel (100) by a bracket (400).

A slidable member (300) is slidably attached to the flap (200) (e.g. FIG. 3, 4A to 4F, FIG. 5). The slidable member (300) is manually actuateable between a retracted (316) (e.g. FIGS. 1 and 2) and deployed (318) position (e.g. FIG. 3). In the deployed (318) position, an exposed portion (312) of the slidable member (300) is unmasked. The slidable member (300) in the deployed position (318) protrudes from behind the flap (200) second side (222) thereby unmasking the exposed portion (312). The exposed portion (312) may optionally be disposed with a third visual indicating surface (314).

The slidable member (300) in the retracted position (316) may be positioned at least partially behind the flap (200) second side (222) thereby masking the exposed portion (312). Where the exposed portion (312) is disposed with a third visual indicating surface (314), the third visual indicating surface (310) is masked in the retracted position (316).

Position of the slidable member (300) in the retracted (316) or deployed (318) position may be readable by the consumer and/or machine. Optionally or additionally, the third visual indicating surface (314) in the deployed (318) position may be readable by the consumer and/or machine. The third visual indicating surface (314) in the retracted (316) position is concealed and may not be readable by the consumer or machine.

The device (100) can hence be set to one of the three states which may be detectable by the position of the flap (200) and slidable member (300). Further, one of the three states may be detectable by reading of the visual indicating surfaces (214, 224, 314).

The flap (200) may be formed from 2 parts (200,-a; 200,-b) and the slidable member (300) may be disposed or sandwiched between both parts (e.g. FIG. 4A to 4F, FIG. 5).

Movement of the slidable member (300) from the retracted position (316) to the deployed (318) position when the flap (200) is in the first position (210) may be prevented. This circumvents accidental movement of the slidable member (300) to the deployed (318) position when the flap (200) is pointing downwards, which could lead to false information.

The flap (200) and slidable member (300) may be provided with a magnetically-regulated linear ratchet mechanism (250) (e.g. FIG. 4A to 4F, FIG. 5). The magnetically-regulated linear ratchet mechanism (250) has an activated state in which ratchet functionality is enabled to restrict movement of the slidable member (300) to one direction (deployed to retracted only), and a de-activated state in which the ratchet is disabled and the slidable member (300) is able to move in both directions (deployed to and from retracted). In the presence of a magnetic field, the ratchet is disabled allowing movement of the slidable member (300) back and forth between the retracted (316) and deployed (318) positions. In the absence of a magnetic field, the ratchet may be enabled allowing a return of the slidable member (300) from the deployed position (318) to the retracted (316) position, but preventing deployment of the slidable member (300) from the retracted (316) position to the deployed position (318).

The permanent magnet (130) disposed in relation to the support panel (100) configured to retain/engage the flap (200) in the second position (220) or $2^{nd}$ state, may also be configured to deactivate the ratchet mechanism (disable the ratchet), allowing deployment and return of the slidable member (300) from the retracted (316) position to the deployed (318) position to the while the flap (200) is in the second position (220) or $2^{nd}$ state.

The linear ratchet mechanism (250) may comprise a leaf spring (252) biased in an open position disposed in fixed relation to the slidable member (300). The leaf spring (252) in the open position provides a ratchet (gear or teeth) part of the mechanism. The ratchet mechanism may further comprise a pawl (256) disposed in fixed relation to the flap (200). Sliding movement of the ratchet (gear or teeth) in relation to the pawl (256) is restricted to one direction when the linear ratchet mechanism (250) is activated.

The linear ratchet mechanism (250) is configured such that the sliding movement of the open leaf spring (252) in the retracted direction over the pawl (256) compresses the leaf spring (252). Further retraction of the leaf spring (252) causes an end edge (254) of the leaf spring (252) to pass past the pawl (256) and open again. Sliding movement of the leaf spring (252) in the opposite direction is prevented by the end edge (254) of the open leaf spring (252) contacting the pawl (256) that acts as a stop member. When the leaf spring (252) is in the closed position, the ratchet functionality is disabled by lowering the gear tooth, and the slidable member (300) can move in both directions. The application of the magnetic field moves the leaf spring (252) from an open (ratchet-enabled) position, to a closed (ratchet disabled) position.

The activation of the linear ratchet mechanism (250) is synchronised with the flap in the $1^{st}$ position (210), and deactivation of the linear ratchet mechanism (250) is synchronised with the flap (200) in the $2^{nd}$ position (220). The magnetically-regulated ratchet mechanism allows a sequential signalling of status of a container that can be read by human eye and machine that reduces ambiguity.

FIG. 4A to 4F show an exemplary sequence of steps for setting the device (10) in the $1^{st}$, $2^{nd}$, and $3^{rd}$ states, and activation/deactivation of the linear ratchet mechanism (250).

In FIG. 4A, the flap (200) is mounted by a hinge on the forward-facing side (110) of support panel (100) and is disposed in the first position corresponding to the $1^{st}$ state. Sandwiched between both parts of the flap (200, -a, -b) is the slidable member (300). The linear ratchet mechanism (250) is activated; movement of the slidable member (300) is restricted to retraction only, and deployment is prevented. The ratchet mechanism comprises a leaf spring (252) in fixed relation to the slidable member (300) and biased in an open configuration. The leaf spring (252) in an open configuration is a ratchet and a pawl (256) is disposed on the flap (200, -a, -b). Sliding movement of the open leaf spring (252) in the deployed direction is prevented by the end edge (254) of the leaf spring (252) contacting the pawl (256) that act as a stop member.

In FIGS. 4B and 4C, the flap (200) is disposed in the second position corresponding to the $2^{nd}$ state. The linear ratchet mechanism (250) is deactivated. The leaf spring (252) is brought in proximity to the magnet (130), causing the leaf spring (252) to close and sequestering its ratchet functionality. The closed leaf spring (252) can move without hindrance from the pawl (256) between the deployed (318) (FIG. 4B) and retracted positions (316) (FIG. 4C) positions.

In FIGS. 4D, 4E and F the flap (200) is disposed in the first position corresponding to the $1^{st}$ state. The linear ratchet mechanism (250) is activated again at it is removed from the magnet (130). Movement of the slidable member (300) in the retracted direction advances the open leaf spring (252) over the pawl (256) that compresses the leaf spring (252) (FIG. 4E). When end edge (254) of the leaf spring (252) has moved past the pawl (256), the leaf spring (252) opens again. Sliding movement of the open leaf spring (252) in the deployed direction is prevented by the end edge (254) of the leaf spring (252) contacting the pawl (256) that acts as a stop member (FIG. 4F).

The support panel, flap, slidable member made at least partially from polymeric material, optionally mouldable. The leaf spring made from magnetically-attractive material, preferably, spring steel. The magnetic is made at least partially from neodymium or an alternative magnetic material.

The first visual indicating surface (214) exposed in the flap (200) first position (210) may be read by human eye, and optionally by a machine. First visual indicating surface (214) may comprise a colour coding (e.g. green marking). First visual indicating surface (214) may comprise a machine-readable marking (e.g. 1D, 2D, holographic bar code).

The second visual indicating surface (224) exposed in the flap (200) second position (220) may be read by human eye, and optionally by a machine. Second visual indicating surface (224) may comprise a colour coding (e.g. red marking). Second visual indicating surface (224) may comprise a machine-readable marking (e.g. 1D, 2D, holographic bar code).

The third visual indicating surface (314) exposed in the slidable member (300) deployed position (318) may be read by human eye, and optionally by a machine. Third visual indicating surface (314) may comprise a colour coding (e.g.

orange marking). Third visual indicating surface (314) may comprise a machine-readable marking (e.g. 1D, 2D, holographic bar code).

The support panel (100) may be disposed with a first maskable region (114) on the forward-facing side (110). The first maskable region (114) may be unmasked in the flap (200) first position (210). The first maskable region (114) may be masked in the flap (200) second position (210). The first maskable region (114) may be disposed with a machine-readable element such as an optical marking, 1D, 2D or holographic barcode, RFID tag, that is unreadable when masked and readable when unmasked.

The support panel (100) is disposed with a second maskable region (124) on forward-facing side (110). The second maskable region (124) may be unmasked in the flap (200) second position (220). The second maskable region (124) may be masked in the flap (200) first position (210). The second maskable surface (124) may be disposed with a machine-readable element such as a 1D, 2D, or holographic barcode, RFID tag that is unreadable when masked and readable when unmasked.

In particular, the second maskable surface (124) may be provided with an RFID tag and the flap (200) is configured to inhibit reading of the RFID tag in the second (220) position. The flap (200) may comprise comprises an RF shield, such as a metallic sheet. The metal sheer may be continuous or formed as a mesh or grill.

The device (10) may be provided with a bracket (400) configured for dismountable attachment of the device (10) to a container. The bracket (400) may be dismountably attached to the support panel (100) back-facing side (120). The bracket (400) may comprise a clamp or clip for dismountable attachment of the device (10) to the container. The bracket (400) may be configured to place the device (10) in an upright orientation wherein the second (220) position is above the first (210) position. The bracket (400) may contain a holder (402) for the permanent magnet. The bracket (400) attached to the container reduces the possibility for mis-assignment of the device (10) to a wrong container as the bracket prevents that the device (10) is freely moveable.

The container may be a medical basket. The medical basket may be provided with a rim to which the bracket (400) attaches.

Figure 5A:
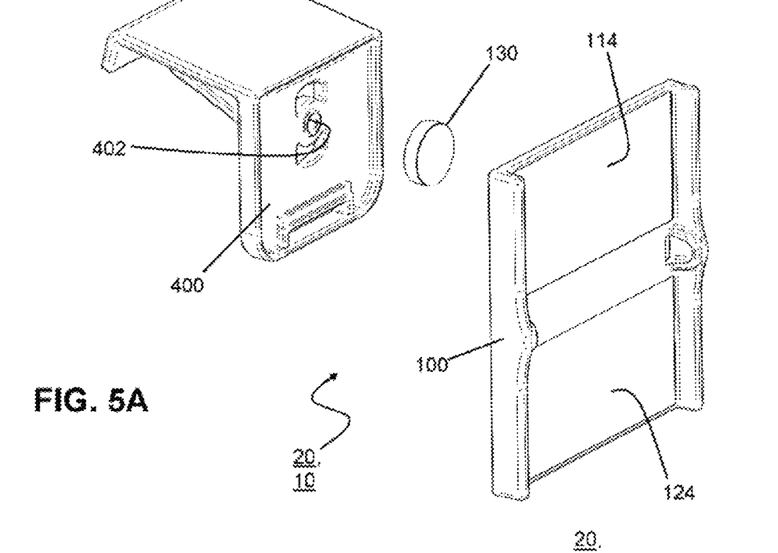
FIGS. 5A and 5B show an exploded isometric view of a presently-described device.
Figure 5B:
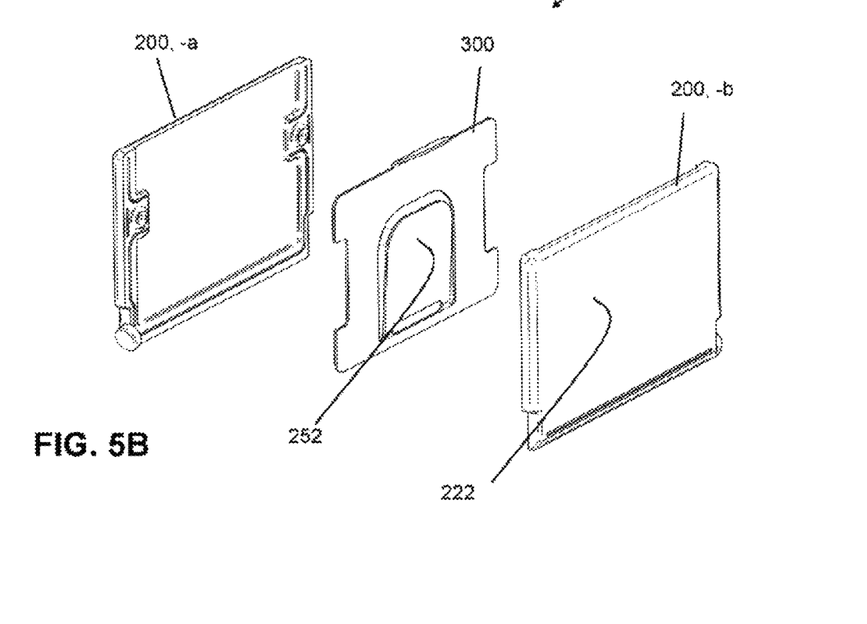

FIGS. 5A and 5B show exploded view of an exemplary device (10). In FIG. 5A the bracket (400) contains a holder (402) for the permanent magnet (130). The bracket (400) attached to the support panel (100) aligns the permanent magnet (130) with the first maskable region (114). The second maskable region (124) is indicated. In FIG. 5B, the flap (200) comprises two panels (200, -a, -b) that flank the slidable member (300). Integrated into the slidable member is the leaf spring (252).

Provided herein is a method for determining individual statuses of containers in a set of containers, each container holding a stock of items comprising:
attaching a separate device (10) described herein to each container in the set;
setting the flap (200) to the first position (210) and the slidable member (300) to the retracted position (316) when a container in the set does not need to be replenished with items,
setting the flap (200) to the second position (220) when a container in the set needs to be replenished with items, thereby exposing the second visual indicating surface (224) (and deactivating the ratchet),
setting the slidable member (300) to the deployed position (318) when items have been re-ordered thereby exposing the third visual indicating surface (314),
setting the slidable member (300) to the retracted position (316) and the flap (200) to the first position (210) when the container has been replenished with items.

The step of setting the flap (200) to the first position (210) and the slidable member (300) to the retracted position (316) may expose the first visual indicating surface (214), that may be readable by eye and optionally by machine. The step of setting the flap (200) to the first position (210) may also activate the ratchet, thereby preventing setting of slidable member (300) to the deployed position (318), but allowing setting of slidable member (300) to the retracted position (316).

The step of setting the flap (200) to the second position (220) may expose the second visual indicating surface (224), that may be readable by eye and optionally by machine. The step of setting the flap (200) to the second position (220) may also deactivate the ratchet, thereby allowing the slidable member (300) to be set repeatably between the deployed position (318) and the retracted position (316).

The method further comprises a step of reading, by the machine, machine-readable parts of first visual indicating surface (214) or second visual indicating surface (224), and logging the status of the container (500).

The one or more devices (10) may be attached to the container in an upright orientation wherein the second (220) position is above the first (210) position.

Further provided is a container provided with one or more devices (10) as described herein.

Further provided herein is a method for determining individual statuses of containers in a set of containers, each container holding a stock of items. The method comprises providing each container with a manually-settable camera-readable status indicator, CRSI. Example of a CRSI (20) include the device (10) of FIGS. 1-5B, and the CRSIs of FIGS. 6A-C (12) and 7A-C (14). Examples of a CRSI (20, 14a-b, 14a-p) attached to a container (46a-b, 46a-p) is shown in FIGS. 8-9.

The CRSI (20) in one settable position may display a barcode (1D, 2D, holographic) (22) that is not displayed in the other settable position. A camera (40) having a steerable field of view (42), FOV, direction is also provided. The camera (40) is positioned and the containers (46a-p) are arranged such that the camera in a single FOV direction captures an image of some of the CRSIs (e.g. 46a-b) of the set of containers (46a-p), and the camera in multiple FOV directions captures multiple images covering all of the CRSIs (e.g. 46a-p) of the set of containers (46a-p). From the multiple images the status of each and every container (46a-p) in the set of containers may be determined.

Figure 9:
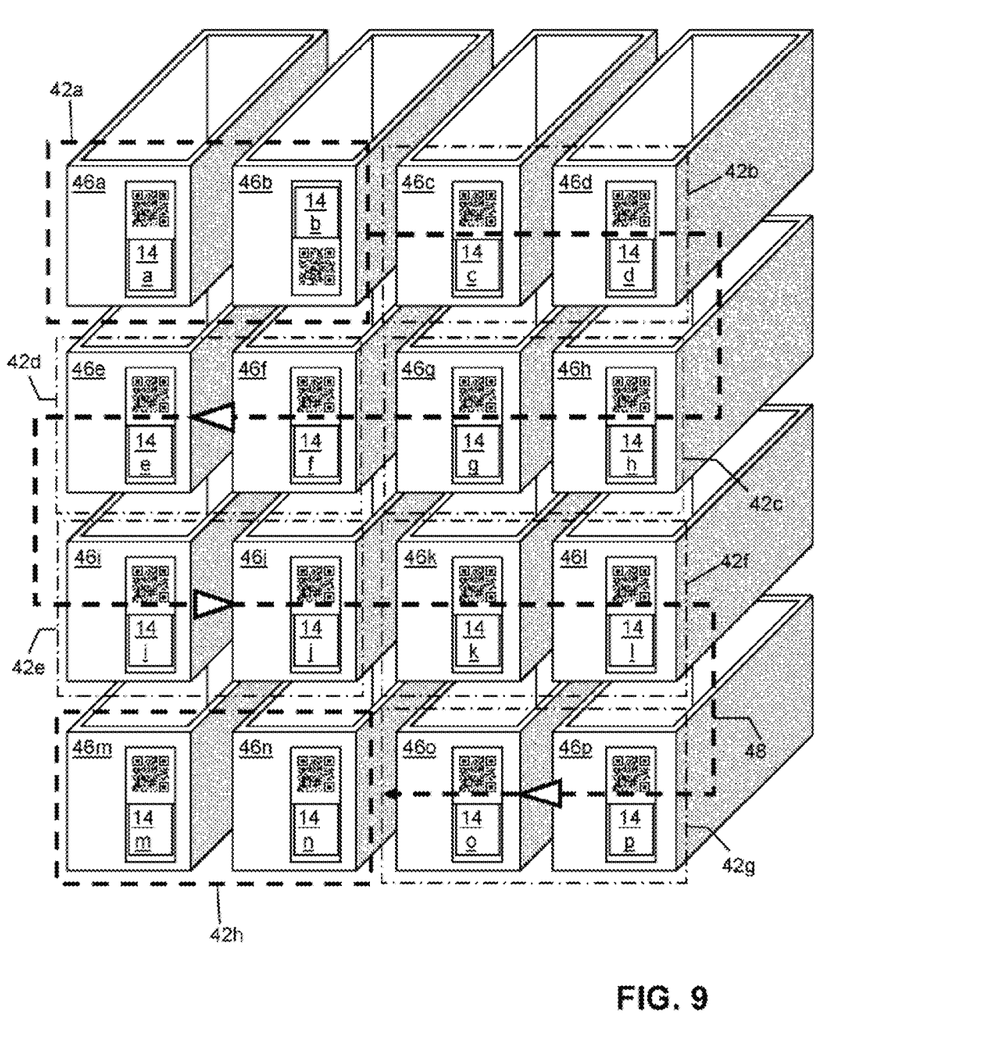
FIG. 9 shows FOV directions moving in a weaving sequence indicated across a set of containers.

FIG. 9 demonstrates multiple FOV directions (42a-h), each FOV direction capturing an image of some (two) of the CRSIs (e.g. 14a-b) of the set of containers (46a-m).

The camera-readable status indicator (CRSI) (20, 10, 12, 14, 14a-p) may be any device having at least 2 different manually settable positions that can be detected by the camera.

The CRSI (20) may be the status-indicating device (10) described elsewhere herein. The CRSI may be an alternative, such as comprising a sliding window, a sliding mask (26, FIG. 6A-C), a rotating mask, a masking flap (28, FIG. 7A-B).

In a $1^{st}$ position, a first visual indicating surface is exposed and a second visual indicating surface is masked or concealed. The $1^{st}$ position corresponds to a $1^{st}$ state of the CRSI indicating that the quantity of items in the container is sufficient, or above a threshold level, or that the container does not need to be replenished. The first visual indicating surface may comprise a machine-readable marking (e.g. 1D, 2D holographic barcode) (24). The $1^{st}$ position, and/or the exposed first visual indicating surface, and/or machine-readable marking thereon is camera-detectable.

In a $2^{nd}$ position, a second visual indicating surface is exposed and the first visual indicating surface is masked or concealed. The $2^{nd}$ position corresponds to a $2^{nd}$ state of the CRSI indicating that the quantity of items in the container is not sufficient, or below a threshold level, or that the container needs to be replenished. A $2^{nd}$ state indicates items need to be re-ordered. The second visual indicating surface may comprise a machine-readable marking (e.g. 1D, 2D holographic barcode) (22). The $2^{nd}$ position, and/or the exposed second visual indicating surface, and/or machine-readable marking thereon is camera-detectable.

A manual change of the CRSI from the $1^{st}$ position or $1^{st}$ state to the $2^{nd}$ position or $2^{nd}$ state or vice versa, can be automatically detected by the camera.

Figure 6:
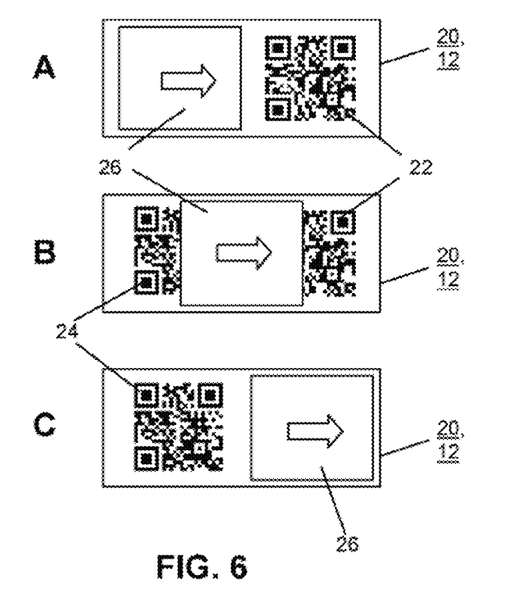
FIGS. 6A-C and 7A-B show examples of manually-settable camera-readable status indicator, CRSIs, in $1^{st}$ and $2^{nd}$ states.

In FIGS. 6A-C, the CRSI (20, 12) comprises a sliding mask (26), slidable from the $1^{st}$ position (FIG. 6A) in which the first visual indicating surface comprising a $1^{st}$ machine-readable marking (2D barcode) (22) is exposed, to (via FIG. 6B) the $2^{nd}$ position (FIG. 6C) in which the second visual indicating surface comprising a machine-readable marking (e.g. 2D barcode) (24) is exposed.

Figure 7:
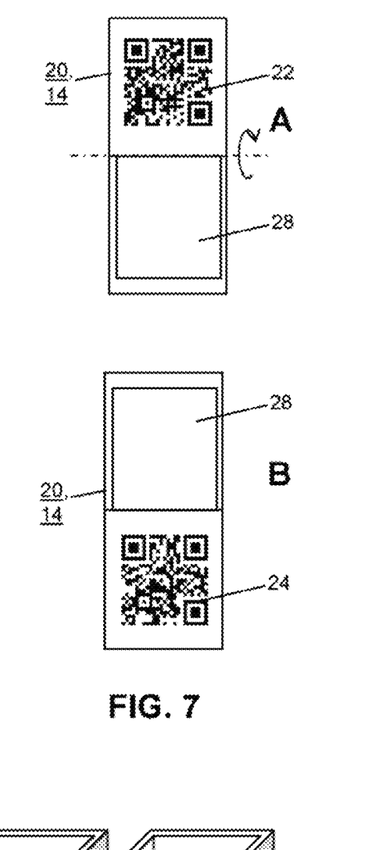
Figure 8:
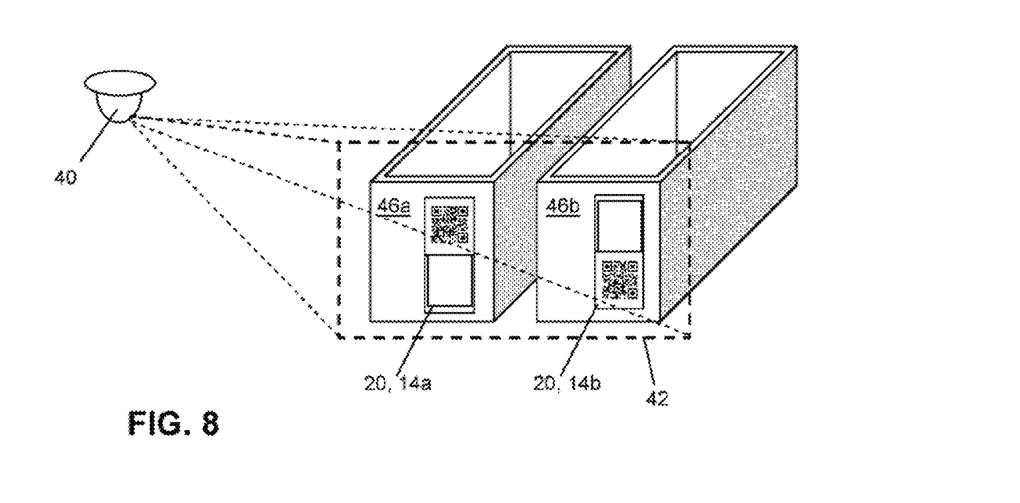
FIG. 8 shows a CRSI attached to a container (46a-b, 46a-p) in different states, and a camera field of view direction

In FIGS. 7A-B, the CRSI (20, 14) comprises a flap (28), rotatable upwards from the $1^{st}$ position (FIG. 7A) in which the first visual indicating surface comprising a machine-readable marking (2D barcode) (22) is exposed, to the $2^{nd}$ position (FIG. 7B) in which the second visual indicating surface comprising a $2^{nd}$ machine-readable marking (e.g. 2D barcode) (24) is exposed.

Barcodes (e.g. 1D, 2D holographic) may be isolated from the captured images using image an image segmentation technique. Barcodes may be segmented from an image on basis of shape recognition (e.g. rectangular) and optionally dimension recognition. A barcode may be disposed proximal to or within an identifier shape such as a line, rectangle, L-shape; recognition of the identifier shape allows for more rapid segmentation of the associated barcode, and correction of distortion (see below). Methods of segmentation of objects from an image are known in the art, for instance, from barcode readers, smart devices used as barcode readers, and others.

There may be a step of correcting for image distortion of the segmented barcodes. When the camera is at an angle to a surface of a barcode, one or more of the images captured of the CRSIs and hence barcodes may be distorted (e.g. skewed, perspective, distortion). The distortion may be corrected by applying a suitable image transformation to restore the shape of the barcode, and/or its shape identifier. Image transformation processes to correct for distortion are known in the art, in image treatment software.

The camera (40) is any digital camera having a steerable field of view (FOV) direction. A digital camera is typically provided with an image sensor (e.g. CCD, CMOS) and a lens assembly comprising one or more lenses for focusing objects onto the image sensor. By steerable, it is meant mechanically steerable achieved by rotation and/or translation of the image sensor and/or associated lens assembly; one or more images can be captured at different FOV directions. By FOV, it is meant the limited part of the overall lens objective-side landscape captured by the camera, and is determined by a size of the FOV. The FOV direction is determined by the orientation of the image sensor and/or associated lens assembly. The FOV size is sometimes expressed as an angular size of a cone (angular field of view). In the art, a camera having a steerable FOV direction is known, such as, for instance, a camera having a pan and tilt capability i.e. two rotational degrees of freedom. The camera may be further provided with an optical zoom facility that changes the size of the FOV. The camera may be a pan, tilt, zoom (PTZ) camera. The pan may be around 360 deg. The camera may be contained in a housing fixable to a wall or ceiling of a storage room.

The containers in the set may be arranged on a shelving system comprising two or more shelves. Each shelf may be configured to hold at least 1 (e.g. 2-5, or more) container.

The shelves may be arranged in columns, each column containing at least 2 (e.g. 2 to 10, or more) shelves arranged vertically (one above the other). The number of shelves in a column is limited by the available height of the storage room. The shelves may be arranged in rows, each row containing at least 1 (e.g. 2 to 10, or more) shelves each row arranged horizontally (one next to the other). The number of shelves in a row is limited by the available width of storage room.

The shelves may be attached to a wall of a storage room. The shelves may be disposed in one rack or in multiple racks adjacently aligned. A rack is supported by a floor of the storage room i.e. it is free-standing, optionally attachable to a wall for stability. The rack may be provided on static feet or on wheels. The wheels may be lockable. In a preferred configuration, the shelving system comprises at least one rack, and each rack comprises one column of shelves (e.g. 5-10 shelves per column).

The shelving system may comprise multiple racks. The racks and camera may be arranged such that each CRSI and hence container is in a line of sight of the camera, more specifically within a FOV direction of the camera. The racks may be arranged in a line, mutually parallel, or to form an "L" or "U" shape, or other geometric shape. With the arrangement, the camera in multiple FOV directions is able to capture multiple images covering all of the CRSIs of the set of containers.

The FOV may be steered so that the FOV direction moves in a pre-defined movement sequence across the shelving system (e.g. across multiple racks) to capture the multiple images covering all of the CRSIs of the set of containers.

FIG. 9 illustrates FOVs (42a-h) at different directions, each FOV capturing 2 different CRSIs (14a&b, 14c&d, 14g&h, 14e&f, 14i&j, 14k&l, 14o&p, 14m&n) at a time. The FOV directions are moved in a weaving sequence indicated (48). The sequence is 42a-42b-42c-42d-42e-42f-42g-42h. Completion of the weaving sequence from 42a to 42h captures the multiple images covering all of the CRSIs (14a-p) of the set of containers (46a-p).

Figure 10:
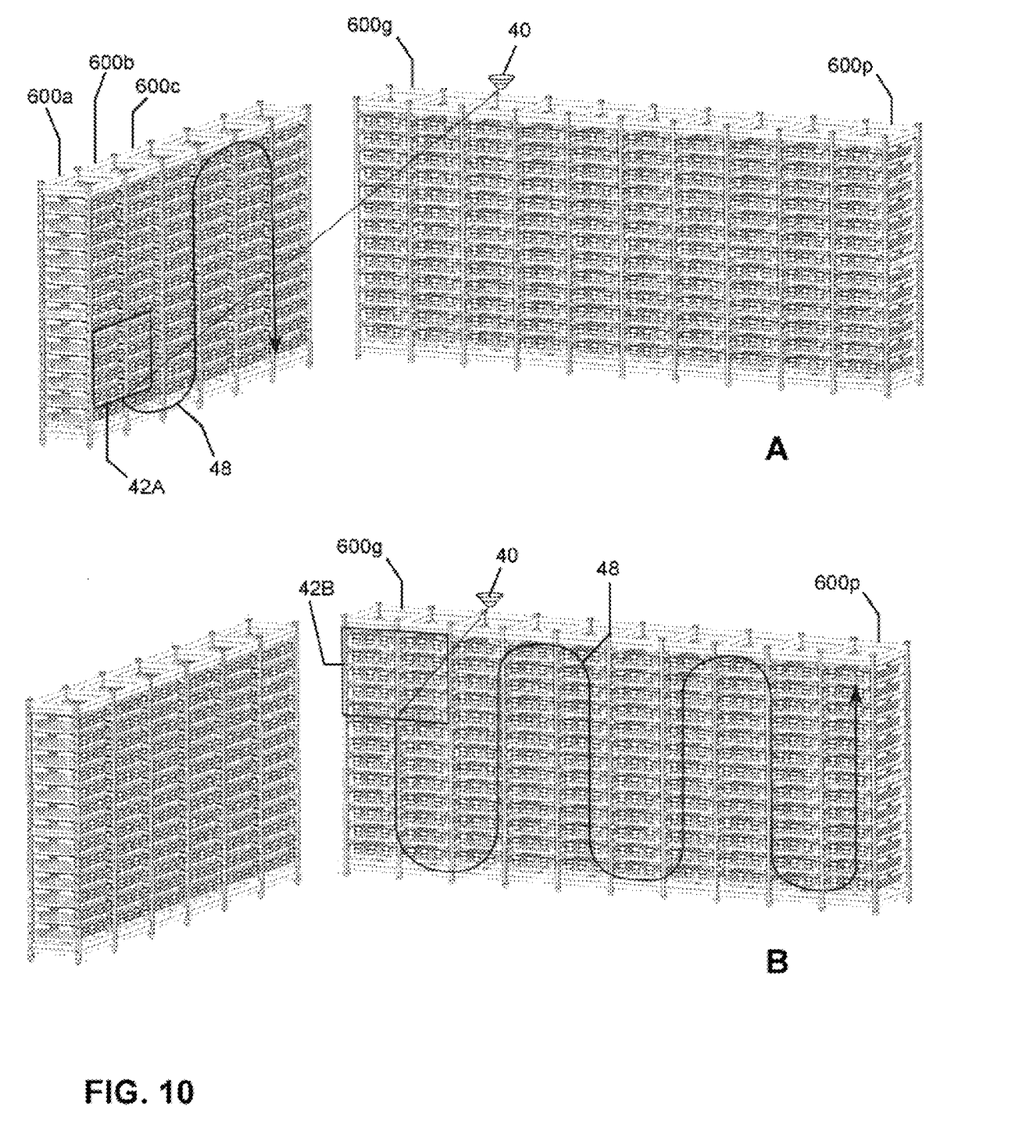

FIGS. 10A-B illustrates a plurality of racks (600a-c . . . g . . . p), holding a plurality of containers. FOVs direction (42A) of the camera (40) starts at a starting position, each FOV capturing 2 several CRSIs at a time. The FOV directions are moved in an up-down weaving sequence (48) across a first row of racks (600a-c . . . ) as shown in FIG. 10A, following by another row of racks (600g . . . p) disposed perpendicular to the first row of racks (600a-c . . . ) starting at FOV direction 42B.

The camera may be contained in a housing fixed in relation to the shelving system.

The container (46) is any suitable for holding a plurality of item for removal by the consumer. A contain typically has a base and wall extending upwards from the base. An opening may be present in a top of the container and/or in a front wall of the container through which items can be removed. Space is available on the container for attachment of a CRSI (20). The container may be a medical basket. The medical basket may be provided with a rim to which the CRSIs attaches.

The method may capture, at regular intervals, the multiple images covering all of the CRSIs of the set of containers. Hence the status of each and every container in the set of containers may be determined at regular intervals.

The multiple images covering all CRSIs may be stored at each time interval, and from the stored multiple images, the container statuses determined.

A check may be performed to confirm that the state of each and every CRSI of the set of containers has been identified. The number of CRSIs may be determined from the multiple images covering all of the CRSIs of the set of containers. The total number of CRSIs is equal to the number of CRSIs in the $1^{st}$ state plus the number of CRSIs in the $2^{nd}$ state. If number of CRSIs determined from the multiple images does not match the known total of containers, the check indicates an error. Responsive to the error, one or more images may be recaptured, preferably limited to the FOV direction where is missing CRSIs is expected to be positioned.

A change in state of a CRSI from $1^{st}$ state to $2^{nd}$ state may release a purchase order of items associated with CRSI and container. A change in state of a CRSI from $2^{nd}$ state to $1^{st}$ state may close a purchase order of items associated with CRSI and container.

The method may be carried out implemented using a computer.

Further provided is a computing device or system configured for performing the method described herein.

Further provided is a computer program or computer program product having instructions which when executed by a computing device or system cause the computing device or system to perform the method described herein.

Further provided is a computer readable medium having stored thereon instructions which when executed by a computing device or system cause the computing device or system to perform the method described herein.

Further provided is a data stream which is representative of a computer program or computer program product having instructions which when executed by a computing device or system cause the computing device or system to perform the method described herein.

Provided herein is a method for determining individual statuses of containers in a set of containers (46*a-p*), each container holding a stock of items comprising:
providing each container with a manually-settable camera-readable status indicator, CRSI (20),
providing a camera (40) having a steerable field of view, FOV, direction, wherein the camera is positioned and the containers are arranged such that:
the camera in a single FOV direction (e.g. 42*a*) captures an image of some of the CRSIs (e.g. 20, 14*a,b*) of the set of containers (46*a-m*), and
the camera (40) in multiple FOV directions (e.g. 42*a-h*) captures multiple images covering all of the CRSIs (e.g. 20, 14*a-p*) of the set of containers (46*a-m*),
determining from the multiple images the status of each and every container in the set of containers.
The CRSI (20) may be manually settable in at least 2 different positions, a first position corresponding to a first state of the CRSI indicating that the container does not need to be replenished with items, and
a second position corresponding to a second state of the CRSI indicating that the container needs to be replenished with items, The CRSI (20) in the $1^{st}$ position may display a $1^{st}$ barcode (1D, 2D, holographic) that is not displayed in the $2^{nd}$ position, and the CRSI in the $2^{nd}$ position may display a $2^{nd}$ different barcode (1D, 2D, holographic) that is not displayed in the $1^{st}$ position.

The method may comprise a step of correcting for image distortion of the barcode images captured by the camera (40).

The CRSI (20) may be the status-indicating device (10) described elsewhere herein.

The camera may be a pan and tilt camera, preferably a pan, tilt zoom (PTZ) camera.

A change in the CRSI status indicting sufficient to insufficient stock of a container may release a purchase order of items associated with CRSI and container.

The containers in the set may be arranged on a shelving system comprising two or more shelves, optionally disposed in one rack or in multiple racks adjacently aligned.

The racks and camera may be arranged such that each CRSI and hence container is in a line of sight of the camera, more specifically within a FOV direction of the camera. The racks may be arranged in a line, mutually parallel, or to form an "L" or "U" shape, or other geometric shape. The FOV may be steered so that the FOV direction moves in a pre-defined movement sequence across the shelving system (e.g. across multiple racks) to capture the multiple images covering all of the CRSIs of the set of containers.

The method may capture, at regular intervals, the multiple images covering all of the CRSIs of the set of containers, and determine the status of each and every container in the set of containers may at regular intervals. A change in state of a CRSI from the $1^{st}$ state to the $2^{nd}$ state may release a purchase order of items associated with CRSI and container.

Further provided herein is a system configured for carrying out the method described herein. The system may comprise:
the camera,
a computing device or system operatively connected to the camera, configured for performing the method described herein.
The system may further comprise one or more of:
a shelving system
set of containers each provided with a manually-settable camera-readable status indicator, CRSI.

The invention claimed is:
1. A status-indicating device (10) for indicating a status of a container comprising:
a support panel (100) having a forward-facing side (110) and an opposing back-facing side (120);
a flap (200) attached by a hinge in relation the forward-facing side (110) of the support panel (100) manually actuateable between a first (210) and second (220) position,
a permanent magnet (130) disposed in relation to the support panel (100) wherein the flap (200) is configured to engage the permanent magnet (130) in the second position (220),
a slidable member (300) slidably attached to the flap (200), manually slidable between a retracted (316) and an deployed (318) position, wherein:
the flap (200) is configured such that an exposed portion (312) of the slidable member (300) is unmasked in the deployed (318) position; and
the flap (200) comprises a magnetically-regulated linear ratchet mechanism (250) activated in the flap (200) first (210) position and deactivated in the flap (200) second (220), configured when activated to restrict movement of the slidable member (300) towards the retracted position (316).

2. The device (10) according to claim 1, wherein the permanent magnet (130) is configured to de-activate the linear ratchet mechanism (250) when the flap (200) in the second (220) position.

3. The device (10) according to claim 1, wherein the flap (200) comprises:
a first (212) side comprising a first visual indicating surface (214) visible in the first position (210) and concealed in the second position (220), and
an opposing second (222) side comprising a second visual indicating surface (224) visible in the second position (220) and concealed in the first position (210).

4. The device (10) according to claim 3, wherein the positions of the flap (200) and slidable member (300) are machine-readable; and/or
first visual indicating surface (214) and second visual indicating surface (224) are machine-readable.

5. The device (10) according to claim 3, wherein the second visual indicating surface (224) comprises a machine-readable barcode.

6. The device (10) according to claim 1, further provided with a bracket (400) configured for dismountable attachment of the device (10) to a container, and configured to place the device (10) in an upright orientation wherein the second (220) position is above the first (210) position.

7. The device (10) according to claim 1, wherein the magnetically-regulated linear ratchet mechanism (250) comprises a ratchet and pawl, wherein:
the ratchet comprises a leaf spring (252) disposed in fixed relation to the slidable member (300),
the pawl (256) is disposed in fixed relation to the flap (200),
the leaf spring (252) in the flap (200) first position (210) is open and ratchet is enabled and linear ratchet mechanism (250) activated, and
the leaf spring (252) in the flap (200) second position (220) is closed by magnetic force of the permanent magnet (130), the ratchet is disabled, and linear ratchet mechanism (250) de-activated.

8. The Use of a device according to claim 1, for indicating a status of a container for holding a stock of items, wherein:
the flap (200) in the first position corresponds to a first state of the device (10) indicating that the container does not need to be replenished with items, and
the flap (200) in the second position corresponds to a second state of the device (10) indicating that the container needs to be replenished with items,
the slidable member (300) in the deployed (318) position corresponds to a third state of the device (10) indicates that the container needs to be replenished, and that the items have been re-ordered.

9. A method for determining individual statuses of containers in a set of containers, each container holding a stock of items comprising:
attaching a device (10) according to claim 1 to each container in the set;
setting the flap (200) to the first position (210) and the slidable member (300) to the retracted position (316) when a container in the set does not need to be replenished with items,
setting the flap (200) to the second position (220) when the items are exhausted from the container, when a container in the set needs to be replenished with items, thereby exposing the second visual indicating surface (224),
setting the slidable member (300) to the deployed position (318) when items have been re-ordered thereby exposing the third visual indicating surface (314),
setting the slidable member (300) to the retracted position (316) and the flap (200) to the first position (210) when the container has been replenished with items.

10. The method according to claim 9, wherein the devices (10) attached to the containers in the set of containers are read by a camera having a steerable field of view, FOV, direction wherein the camera is positioned and the containers are arranged such that the camera in a single FOV direction captures an image of some of the devices (10) of the set of containers, and the camera in multiple FOV directions captures multiple images covering all of the devices (10) of the set of containers, and the status of each and every container in the set of containers is determined from the multiple images.

11. The method according to claim 10, wherein the second visual indicating surface (224) and optionally first visual indicating surface (214) of the devices (10) are read by the camera.

12. The method according to claim 10 or 11, wherein a change in state of a device (10) from 1st state to 2nd state releases a purchase order of items associated with the device (10) and container.

13. A method for determining individual statuses of containers in a set of containers (46a-p), each container holding a stock of items comprising:
providing each container with a manually-settable camera-readable status indicator, CRSI (20),
providing a camera (40) having a steerable field of view, FOV, direction, wherein the camera is positioned and the containers are arranged such that:
the camera in a single FOV direction (e.g. 42a) captures an image of some of the CRSIs (e.g. 20, 14a,b) of the set of containers (46a-m), and
the camera (40) in multiple FOV directions (e.g. 42a-h) captures multiple images covering all of the CRSIs (e.g. 20, 14a-p) of the set of containers (46a-m),
determining from the multiple images the status of each and every container in the set of containers.

14. The method according to claim 13, wherein the CRSI (20) is manually settable in at least 2 different positions,
a first position corresponding to a first state of the CRSI indicating that the container does not need to be replenished with items, and
a second position corresponding to a second state of the CRSI indicating that the container needs to be replenished with items.

15. The method according to claim 13 or 14, wherein the CRSI (20) in the 1st position is displays a 1st barcode (1D, 2D, holographic) that is not displayed in the 2nd position, and the CRSI in the 2nd position displays a 2nd different barcode (1D, 2D, holographic) that is not displayed in the 1st position.

16. The method according to claim 13, further comprising a step of correcting for image distortion of the barcode images captured by the camera (40).

17. The method according to claim 13, wherein the CRSI (20) is a status-indicating device (10) comprising:
- a support panel (100) having a forward-facing side (110) and an opposing back-facing side (120);
- a flap (200) attached by a hinge in relation the forward-facing side (110) of the support panel (100) manually actuatable between a first (210) and second (220) position,
- a permanent magnet (130) disposed in relation to the support panel (100) wherein the flap (200) is configured to engage the permanent magnet (130) in the second position (220),
- a slidable member (300) slidably attached to the flap (200), manually slidable between a retracted (316) and a deployed (318) position, wherein:
- the flap (200) is configured such that an exposed portion (312) of the slidable member (300) is unmasked in the deployed (318) position; and
- the flap (200) comprises a magnetically-regulated linear ratchet mechanism (250) activated in the flap (200) first (210) position and deactivated in the flap (200) second (220), configured when activated to restrict movement of the slidable member (300) towards the retracted position (316).

18. The method according to claim 13, wherein the camera is a pan and tilt camera, preferably a pan, tilt, zoom (PTZ) camera.

19. The method according to claim 13, wherein a change in the CRSI status indicting sufficient to insufficient stock of a container releases a purchase order of items associated with CRSI and container.

20. The method according to claim 13, wherein the containers in the set are arranged on a shelving system comprising two or more shelves, optionally disposed in one rack or in multiple racks adjacently aligned.

21. The method according to claim 20, wherein the racks and camera are arranged such that each CRSI and hence container is in a line of sight of the camera, more specifically within a FOV direction of the camera.

22. The method according claim 20, wherein the racks are arranged in a line, mutually parallel, or to form an "L" or "U" shape, or other geometric shape.

23. The method according to claim 13, wherein the FOV is steered so that the FOV direction moves in a pre-defined movement sequence across the shelving system (e.g. across multiple racks) to capture the multiple images covering all of the CRSIs of the set of containers.

24. The method according to claim 13, wherein the method captures, at regular intervals, the multiple images covering all of the CRSIs of the set of containers, and determines the status of each and every container in the set of containers at regular intervals.

25. The method according to claim 24, wherein a change in state of a CRSI from the 1st state to the 2nd state releases a purchase order of items associated with CRSI and container.

26. A system configured for carrying out the method according to claim 13 comprising:
- the camera,
- a computing device or computing system operatively connected to the camera, configured for performing the method according to claim 13.

27. The system according to claim 26, further comprise one or more of:
- a shelving system,
- set of containers each provided with a manually-settable camera-readable status indicator, CRSI.

* * * * *